Dec. 9, 1969   H. H. WAITE   3,482,401
HIGH PRESSURE GENERATING DEVICE
Filed May 17, 1968   3 Sheets-Sheet 1

Dec. 9, 1969   H. H. WAITE   3,482,401
HIGH PRESSURE GENERATING DEVICE
Filed May 17, 1968   3 Sheets-Sheet 3

United States Patent Office 3,482,401
Patented Dec. 9, 1969

3,482,401
HIGH PRESSURE GENERATING DEVICE
Harold H. Waite, North Warren, Pa., assignor to National Forge Company, Warren, Pa., a corporation of Delaware
Filed May 17, 1968, Ser. No. 730,078
Int Cl. F15b 3/00
U.S. Cl. 60—54.5                                15 Claims

ABSTRACT OF THE DISCLOSURE

A high pressure generating device having three concentric, hollow, fluid-filled cylinders with an annular space between the inner and intermediate cylinders and an annular space between the intermediate and outer cylinders. The opposite ends of the outer cylinder are closed. First and second pistons each having an annular body and an enlarged head act in the annular space between the intermediate and outer cylinders and within the inner cylinder, respectively. Each of the heads is adjacent a respective one of the outer cylinder end closures. An external fluid pressure source communicates with the space between the outer and intermediate cylinders and with the space between the first piston head and the adjacent-end closure. The resultant pressure developed in the annular space between the inner and intermediate cylinders is transmitted through a passage to the space between the second piston head and the adjacent other end closure. A resultant high pressure is developed within the inner cylinder.

BACKGROUND OF THE INVENTION

The present invention relates to pressure generating devices and more particularly to such devices which are intended to produce fluid pressures of the order of 100,000 to 500,000 p.s.i. or highr.

High fluid pressure are required for a variety of industrial and other processes, e.g., isotate presses and hydrostatic extrusion presses. The generation of such pressures in economical and safe equipment has been a problem.

Various items of equipment have been proposed for the generation of high pressures, but have not proven wholly satisfactory because of a number of problems. Among the problems has been one of achieving high pressures in equipment of reasonable size, and which nevertheless provides adequate safety against the hazards involved in handling high pressures. Another problem has been achieving high pressures in a device of relatively simple construction which avoids the difficulties inherent in complex structures subjected to high pressures. Still another problem has been affording convenient access to the high pressure chamber to permit utilization of the high pressure.

The principal object of the present invention has been the provision of a novel and improved device for the generation of high pressures which overcomes the problems referred to above.

More particularly, it has been an object of the present invention to provide such a device which is simple in construction, safe to operate and relatively economical to build.

Another object of the invention has been the provision of such a device in which the stress on each element is kept to a level which can be resisted with the usual materials available for pressure vessel construction and with parts of reasonable size.

A feature of the invention has been the provision of a cascading intensifier made up of concentric cascading cylinders which are mechanically restricted to maintain alignment and to avoid eccentric loading. Another important feature of the invention has been the provision of a cascading intensifier in which the pressure which actuates any particular piston also acts upon the exterior wall of the cylinder in which that piston moves.

Other and further objects, features and advantages of the invention will appear more fully from the following description of the invention.

SUMMARY OF THE INVENTION

A pressure generating device in accordance with the invention comprises a cylindrical pressure vessel having a first hollow cylindrical interior cavity coaxial with the vessel, closure means acting in opposite ends of the pressure vessel for closing the respective ends of the first cavity, a first cylinder coaxial with the vessel and located within the first cavity, the first cylinder having an outside diameter less than the diameter of the first cavity to define a first pressure chamber between the inner cylindrical surface of the pressure vessel and the outer cylindrical surface of the first cylinder, the first cylinder having a second hollow cylindrical interior cavity coaxial with the vessel, a second cylinder coaxial with the vessel and located within the second cavity, the second cylinder having an outside diameter less than the inside diameter of the first cylinder to define therebetween a second pressure chamber, the second cylinder having a third hollow cylindrical interior cavity coaxial with the vessel and forming a third pressure chamber, a first piston having an annular body located in and in sildable pressure-tight contact with the walls of the second chamber at the end of the second chamber nearest one end of the vessel, the first piston having an annular head with a diameter greater than the diameter of the body of the first piston, the head of the first piston being spaced from the closure means at the one end of the vessel to define therebetween a first fluid receiving space, a second piston having a cylindrical body located in and in slidable pressure-tight contact with the walls of the third chamber at the end of the third chamber nearest the other end of the vessel, the second piston having a cylindrical head with a diameter greater than the diameter of the body of the second piston, the head of the second piston being spaced from the closure means at the other end of the vessel to define therebetween a second fluid receiving space, first fluid passage means communicating between the first pressure chamber and the exterior of the vessel to admit a fluid under a first pressure to the first pressure chamber, the second and third pressure chambers also being filled with fluid, fluid passage means intercoupling the first pressure chamber and the first fluid receiving space to apply the first fluid to the head of the first piston whereby the first piston acts to compress the fluid in the second chamber to a second pressure, and second fluid passage means intercoupling the second chamber and the second fluid receiving space to apply the fluid from the second chamber to the head of the second piston whereby the second piston acts to compress the fluid in the third chamber to a third pressure.

BRIEF DESCRIPTION OF THE DRAWINGS

The invention will now be described in greater detail with reference to the appended drawings in which.

DETAILED DESCRIPTION OF AN EMBODIMENT OF THE INVENTION

Figure 1:
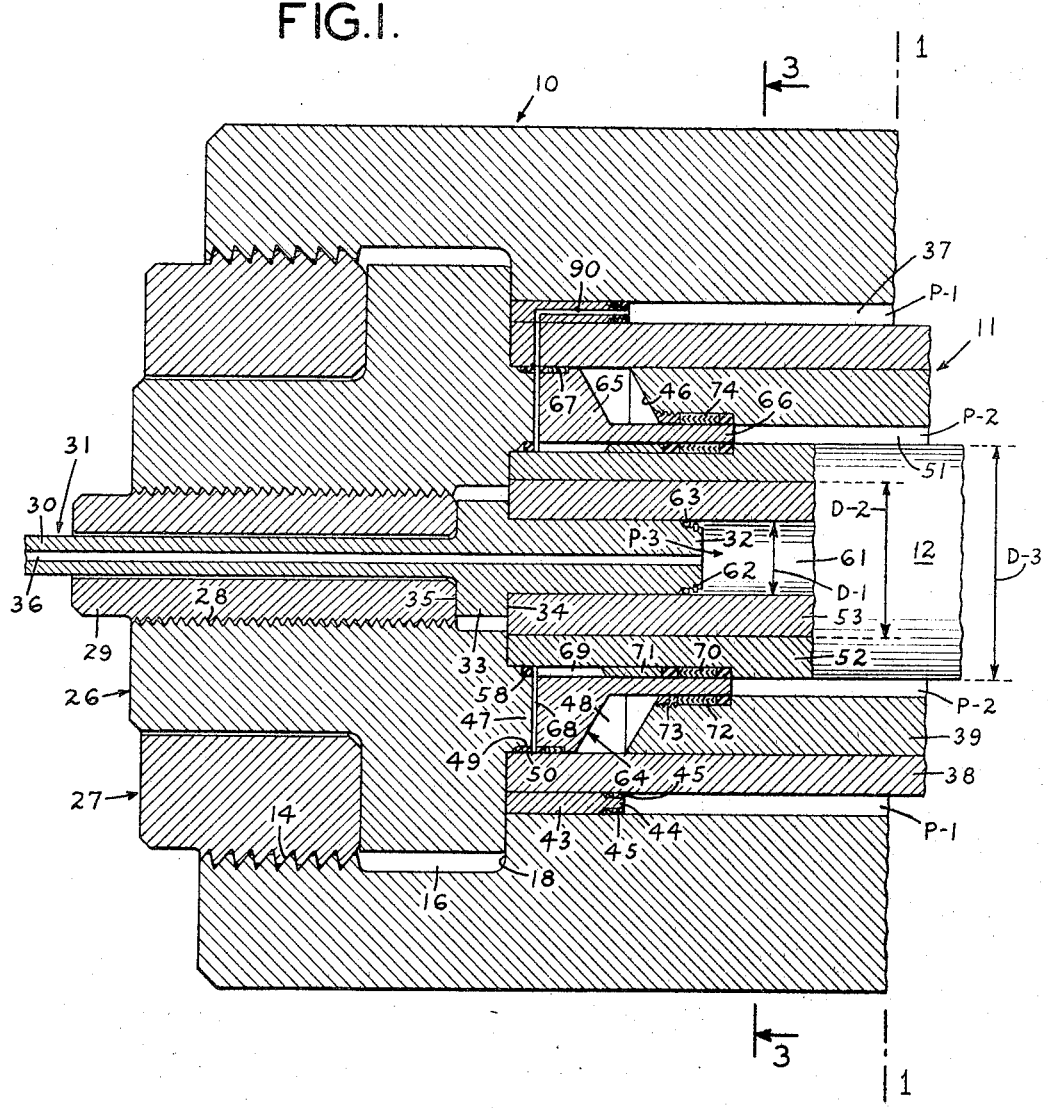
FIG. 1 and 2, when joined along the line 1—1, form a longitudinal sectional view of a pressure generating device embodying the invention.
Figure 2:
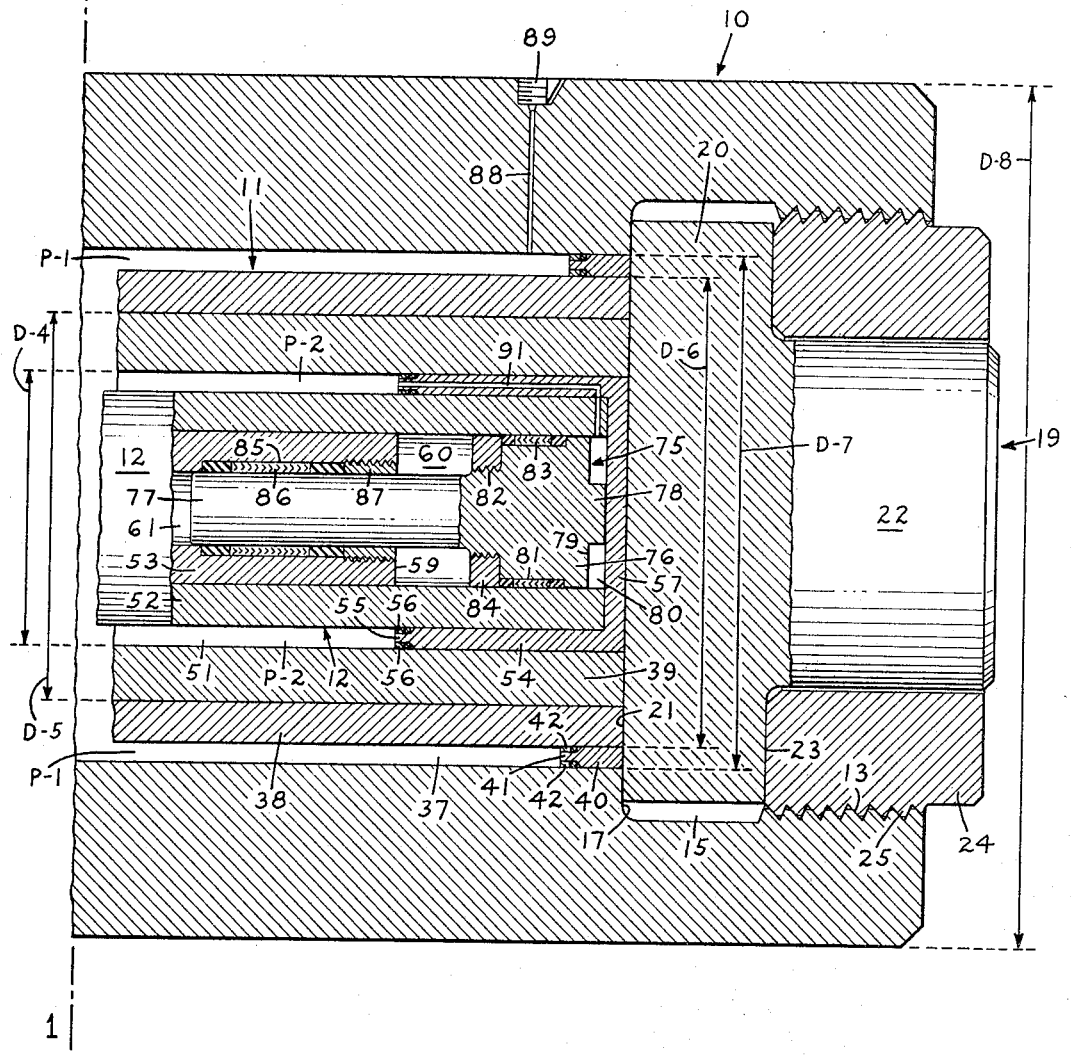
Figure 3:
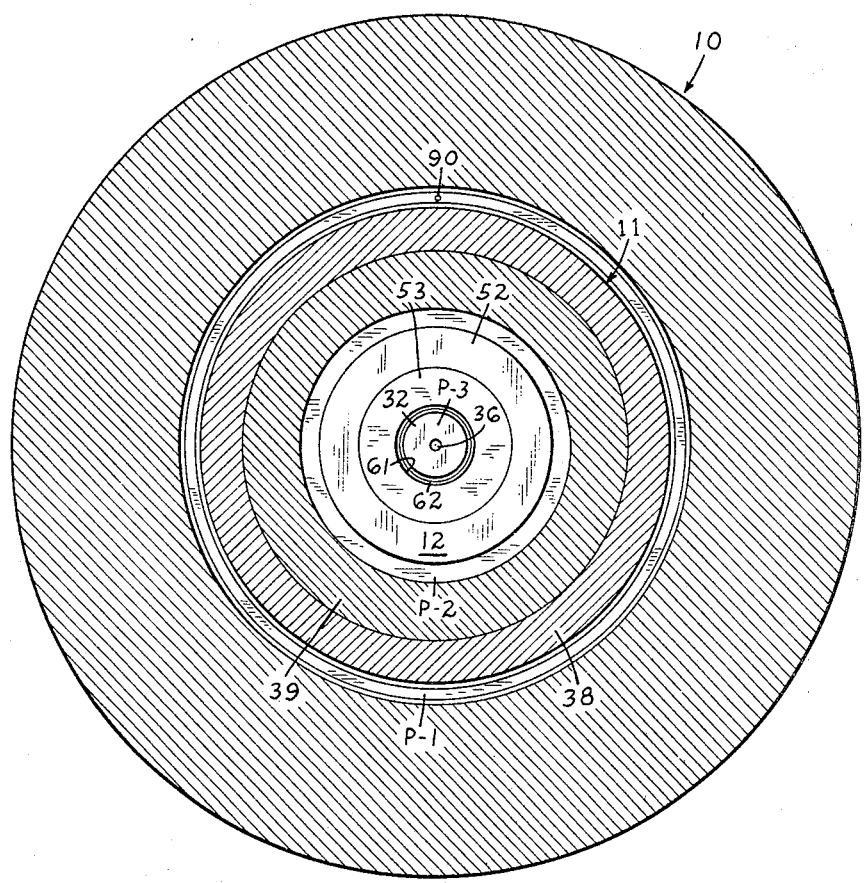
FIG. 3 is a cross sectional view taken along the line 3—3 of FIG.1.

Referring now the drawings, there is illustrated a pressure generating device comprising three hollow concentric cylinders 10, 11 and 12. The outer cylinder 10 is a pressure vessel and may be made of any suitable material, e.g., high quality steel, customarily used for pressure vessels subjected to like pressure differentials. The cylinders 11 and 12 are preferably made of the same material.

Both ends of vessel 10 are open and are provided with internal threads designated 13 and 14, respectively. Axially inwardly of the threads 13 and 14 are annular grooves 15 and 16, respectively, which terminate in annular shoulders 17 and 18, respectively.

A plug 19 serves as a closure element for the right hand end vessel 10. Plug 19 has an enlarged head 20 which lies in groove 15 with its end surface 21 in contact with shoulder 17. The outside diameter of head 20 is slightly less than the internal diameter of threads 13 to permit insertion of head 20 into the open right end of vessel 10. Plug 19 has a reduced diameter body 22 projecting outwardly from annular shoulder 23 of head 20.

The plug 19 is retained in position in the open end of vessel 10 and with surface 21 in tight engagement with annular shoulder 17 by a nut 24 which has external threads 25 in threaded engagement with threads 13.

Plug 19 and nut 24 form a closure for the right end of vessel 10. However, this end closure could be integral with vessel 10.

The other end of vessel 10 is provided with a similar plug 26 and nut 27 serving as the end closure for the left end of the vessel 10. However, while plug 19 is solid, plug 26 and nut 27 serving as the end closure for the plug 26 has a cylindrical hole 28 concentric with vessel 10 and having internal threads which receive an externally threaded annular bushing 29. The central hole of bushing 29 accommodates stem 30 of a fitting 31. Fitting 31 has an inner cylindrical end 32 and an enlarged diameter intermediate portion 33.

The enlarged diameter portion 33 has an inner annular shoulder 34 and an outer annular shoulder 35 which contacts the inner end of bushing 29. Fitting 31 has a central cylindrical passage 36 extending throughout its length.

The vessel 10 has a wall thickness which is the difference between the outside diameter D8 and the inside diameter D7. This wall thickness is selected to accommodate the pressure differential to which it is subjected and also to provide a margin of safety if there should be a failure of a higher pressure element within the vessel.

Intermediate cylinder 11, which is concentric with vessel 10, has an outer diameter D6 which is smaller than inner diameter D7 of vessel 10, affording therebetween a first annuluar pressure chamber 37. While cylinder 11 could be made from one integral piece, it is preferable to form the cylinder 11 from two cylindrical sleeves 38 and 39 shrunk fit together to obtain a residual negative compressive stress at zero (atmospheric) pressure. This construction reduces total stress levels at operating pressures.

The chamber 37 is closed at the right end by an annular bushing 40 which abuts against inner face 21 of plug 19. The inner end of bushing 40 is formed as a reduced diameter neck 41 which accommodates O-ring seals 42 which act to prevent leakage of pressure fluid from the right end of chamber 37. The left end of chamber 37 is closed by an annular bushing 43 which abuts against the inner face of plug 26. A reduced diameter neck 44, and O-ring seals 45 similarly prevent leagage of pressure fluid from the left end of chamber 37.

Sleeve 38 extends the full distance between the inner faces of plugs 19 and 26. Sleeve 39 is shorter than sleeve 38 and extends from the inner face of plug 19 and terminates at an inclined annular shoulder 46. The shoulder 46 is axially spaced from an annular flange 47 which projects axially inwardly from the inner face of plug 26. The annular space between shoulder 46 and flange 47 is designated 48. Flange 47 is provided with an annular groove 49 at its radially outer edge to accommodate an O-ring seal 50.

Inner cylinder 12, which is concentric with vessel 10, has an outer diameter D3 which is smaller than inner diameter D4 of cylinder 11, affording therebetween a second annular pressure chamber 51. It is preferable to form cylinder 11 from two shrunk fit cylindrical sleeves 52 and 53.

The chamber 51 is closed at the right end thereof by a bushing element 54 having a reduced diameter neck 55 which accommodates O-ring seals 56 which serve to prevent leakage of pressure fluid from the right end of chamber 51. While the annular walls of bushing element 54 could abut against face 21 of plug 19, as in the case of bushing 40, it is preferable in view of the higher pressure involved to provide bushing element 54 with an integral base 57 which abuts against face 21 and distributes the stress to a much greater surface area of face 21. Thus bushing element 54 is formed as a flat bottomed cup.

One end of sleeve 52 abuts against the inner face of plug 27 radially inward of flange 47, an O-ring seal 58 being provided to prevent leakage of pressure fluid. The other end of sleeve 52 abuts against the inner face of base 57 of element 54. One end of sleeve 53 abuts against the inner face of plug 26 and against shoulder 34, the sleeve 53 spanning the space between these surfaces. The other end of sleeve 53 terminates at an annular shoulder 59 which is axially spaced from the inner face of base 57 to afford a space 60.

One end of central cylindrical chamber 61 formed by the hollow cylindrical opening sleeve 53 is closed by the end 32 of fitting 31. An annlular groove 62 at the inside face of fitting end 32 accommodates an O-ring seal 63 which prevents leakage of pressure fluid from chamber 61 between fitting 31 and sleeve 53.

An annular piston 64 has a cylindrical head 65 acting in space 48 and a sylindrical body 66 acting in chamber 51. The outer diameter of head 65 is nominally equal to the inside diameter D5 of sleeve 38, the actual diameter of head 65 being slightly less so that head 65 is axially slidable in space 48. The outer end of head 65 is provided with an annular groove which accommodates a chevron seal 67 which prevents leakage of pressure fluid between head 65 and sleeve 38 from an annular fluid receiving space 68 defined by the inner face of flange 47 and the outer face of head 65.

Body 66 of piston 64 has an outside diameter which is nominally equal to the inside diameter D4 of sleeve 39 but has an actual diameter which is slightly less so that body 66 will be slidable in chamber 51. The inside diameter of both body 66 and head 65 of piston 64 is nominally equal to outside diameter D3 of sleeve 52, but the actual inside diameter will be slightly greater so that the piston 64 will be slidable in chamber 51.

The left hand end of sleeve 52 is provided with an annular groove 69 which accommodates a chevron seal 70 and an annular bushing 71 which serves to hold seal 70 in place. The left hand end of sleeve 39 is provided with an annular groove 72 which is threaded at the left end to receive a threaded bushing 73 which serves to retain a chevron seal 74 contained in groove 72.

Body 66 of piston 64 is slidable between bushings 71 and 73, but chevron seals 70 and 74 prevent leakage of pressure fluid from chamber 51 past body 66.

A piston 75 has a cylindrical head 76 slidable in chamber 60 and a cylindrical body 77 slidable in chamber 61. Head 76 has an outside diameter which is nominally equal to inside diameter D2 of sleeve 52 but its actual diameter is slightly less to permit head 76 to slide in chamber 60. Similarly, body 77 has an outside diameter which is nominally equal to inside diameter D1 of sleeve 53, but is actually slightly less to permit body 77 to slide in chamber 61.

Head 76 is provided with an axially extending cylindrical flange 78 at the right end thereof and which is adapted to abut against the inner face of base 57. Presence of flange 78 leaves an annular groove 79 which represents the minimum size of an annular fluid receiving space 80 defined by the inner face of base 57 and the axially outer face of head 76.

Head 76 is provided with a shallow annular groove 81 and a deep annular groove 82 in its radially outer face. Groove 81 accommodates a chevron seal 83 which acts to prevent leakage of pressure fluid from space 80 past head 76. The axial surface of groove 82 is threaded to receive a piston ring 84 which serves to retain seal 83 in place.

The right hand end of sleeve 53 is provided with an internal anular groove 85 which accommodates a chevron seal 86 held in place by a threaded bushing 87 carried in a threaded end of groove 85. Piston body 77 is slidable in bushing 87 and seal 86 prevents leakage of pressure fluid from chamber 61 past piston body 77.

A fluid passage 88, which preferably is a narrow cylindrical drilled hole, extends radially through the outer wall of vessel 10 to provide fluid communication between chamber 37 and the exterior of the vessel. The radially outer end of passage 88 may be enlarged and threaded, as shown at 89, to accommodate a fitting for connection to a pump or other suitable source of fluid under pressure. The fluid supplied through passage 88 and which fills chamber 37 should be compressible. Typical examples of suitable pressure fluids are gasoline and propane. Other examples are castor oil and water-glycerine mixtures.

A fluid passage 90, which preferably is a narrow cylindrical drilled hole, extends axially through bushing 43 and radially through bushing 43 and sleeve 38 to provide a fluid communication passage between chamber 38 and fluid receiving space 68. It will be evident that the fluid pressure P-1 active in chamber 37 will also be active in chamber 68 and hence on the head of piston 64, tending to force the latter to move axially to the right.

The space 48 between the inner face of the head of piston 64 and outer shoulder 46 of sleeve 39 is preferably filled with air or some other readily compressible gas which will not appreciably interfere with motion of piston 64 axially to the right. The space 48 may, if desired, be vented to the atmosphere.

Chambers 51 and 61 are both filled with a compressible fluid which may be the same fluid, e.g., gasoline or propane, used to fill chamber 37. A different fluid may be used to obtain the best results at the various fluid pressures.

A fluid passage 91, which preferably is a narrow drilled hole, extends readily through sleeve 39 adjacent the right hand end thereof and radially into and axially through the adjacent wall of bushing element 54 to provide fluid communication between chamber 51 and fluid receiving space 80.

The fluid in chamber 51 will be compressed by piston 64 as it moves axially to the right, yielding a pressure P-2 in chamber 51 which will be greater than the pressure P-1 by reason of the fact that head 65 has a larger area exposed to pressure P-1 than body 66 has exposed to pressure P-2.

The fluid passage 91 makes the pressure P-2 active in chamber 80 and against the head of piston 75. Pressure P-2 acting on the head of piston 75 forces that piston to move axially to the left, thereby resulting in a pressure P-3 in chamber 61. Pressure P-3 will be higher than pressure P-2 because the area of the head of piston 75 subjected to pressure P-2 is greater than the area of the body of piston 75 subjected to pressure P-3.

The space 60 between the opposed faces of piston ring 84 and sleeve 53 is preferably filled with air or some other readily compressible gas which will not interfere appreciably with motion of piston 75 to the left.

It will be observed that the pressure P-1 which acts on the head of piston 64 is also active in chamber 37 surrounding cylinder 11. Similarly the pressure P-2 which acts on the head of piston 75 is also active in chamber 51 surrounding cylinder 12. As a result, the walls of vessel 10 are subjected in normal operation to no more than the pressure differential P-1 to atmospheric. Similarly the walls of chamber 11 are subjected in normal operation to no more than the pressure differential P-2-P-1. Finally the walls of cylinder 12 are subjected in normal operation to no more than the pressure differential P-3-P-2.

Should failure of a high pressure stage occur, and this must always be considered a possibility when dealing with high pressures, the sudden additional pressure active on the next exterior stage will only be the presssure differential and will not be the total pressure. For example, failure of cylinder 12 would subject cylinder 11 to the pressure P-3-P-1 and not to the entire pressure P-3. If desired, a frangible element or other pressure relief device (not shown) may be incorporated in vessel 10 to provide for controlled relief of pressure should the pressure active in chamber 37 exceed a safe value.

The pressure P-3 generated in chamber 61 may be used in that chamber. In such case passage 36 would be omitted or closed off. However, it is preferable to conduct fluid under pressure P-3 from chamber 61 through passage 36 to whatever place the pressure P-3 is desired, e.g., the pressure vessel of an isostatic press. Suitable valve means (not shown) normally will be provided to close off passage 36.

Should it be desired to achieve a pressure higher than P-3 for a given supply pressure P-1, one or more additional stages of amplification may be provided. Thus piston 75 could be constructed in the same manner as piston 64, an additional cylinder could be provided within but radially spaced from cylinder 12, and a piston corresponding to piston 75 would be mounted at the left end so as to have its head subjected to pressure P-3 and its body active in the additional cylinder. In such case the pressure take-off passage would pass through the center of the annular piston substituted for piston 75. In any case successive pistons would be located at opposite ends of the device so that the central high pressure chamber would always be accessible to the outside.

As a practical example of the embodiment of the invention illustrated, the dimension D-1 to D-8 might be as follows:

D-1=2″    D-5=10″
D-2=4″    D-6=12″
D-3=6″    D-7=13″
D-4=8″    D-8=22″

These dimensions would be suitable for the pressures referred to below and with the various elements made of an alloy steel having good fatigue properties.

With a supply pressure P-1 of 43,860 p.s.i., P-2 would equal 100,000 p.s.i. and P-3 would equal 400,000 p.s.i. With a supply pressure P-1 of 55,000 p.s.i., P-2 would equal 125,000 p.s.i., and P-3 would equal 500,000 p.s.i. The dimensions D-6, D-7 and D-8 would not, of course, affect the pressure differentials.

The length dimensions can be varied considerably, depending largely on compressibility of the pressure fluid or fluids and on the buckling resistance of the high pressure piston. By way of example, in the embodiment shown the chamber 61 between the opposed faces of fitting 31 and piston 75 might be 10″ long.

The various dimensions and pressures set forth above are given only by way of example and should not be taken as in any way limiting the scope of the invention. Similarly, the various seals suggested are given only by way of example since other appropriate seals may be used. In general the seals will be of an elastomeric, self sealing type.

In view of the high pressures involved, the cylinders 11 and 12 will tend to decrease slightly in thickness resulting, in view of the Poisson effect and in accordance with Poisson's ratio for the metal used, in a tendency for the cylinders to grow in length. In the embodiment of the invention illustrated, the sleeves 38 and 52 are positively restrained against longitudinal expansion by contact at opposite ends with the respective end closures of pressure vessel 10. Such restraint reduces the elastic strain on the cylinders and hence reduces the stress levels therein.

While the invention has been described in connection with a specific embodiment thereof and in a specific use, various modifications thereof will occur to those skilled in the art without departing from the spirit and scope of the invention as set forth in the appended claims.

What is claimed is:

1. A pressure generating device, comprising:
   (a) outer, intermediate and inner coaxial cylinders, said intermediate cylinder being radially spaced from said outer cylinder to define therebetween a first annular pressure chamber, said inner cylinder being radially spaced from said intermediate cylinder to define therebetween a second annular pressure chamber, and said inner cylinder being hollow to define therein a third cylindrical pressure chamber;
   (b) closure means for the opposite ends of said outer cylinder;
   (c) a first annular piston having an annular body aligned with and slidable in said second pressure chamber, said first piston having an enlarged head axially spaced from the closure means at one end of said outer cylinder to define therebetween a first fluid receiving space;
   (d) a second cylindrical piston having a body aligned with and slidable in said third pressure chamber, said second cylinder having an enlarged head axially spaced from the closure means at the other end of said outer cylinder to define therebetween a second fluid receiving space;
   (e) a compressible fluid contained in and filling each of said chambers;
   (f) a first fluid passage communicating between the exterior of said outer cylinder and said first pressure chamber to permit the fluid in said first pressure chamber to be pressurized to a first elevated pressure;
   (g) a second fluid passage intercoupling said first chamber and said first space to admit said fluid under said first pressure to the head of said first piston whereby said first piston is moved axially in said second chamber to compress the fluid in said second chamber to a second elevated pressure higher than said first pressure; and
   (h) a third fluid passage intercoupling said second chamber and said second space to admit said fluid under said second pressure to the head of said second piston whereby said second piston is moved axially in said third chamber to compress the fluid in said third chamber to a third elevated pressure higher than said second pressure.

2. A pressure generating device as set forth in claim 1 having a fourth fluid passage intercoupling said third chamber and the exterior of said outer cylinder to deliver said fluid at said third pressure.

3. A pressure generating device as set forth in claim 2 in which said fourth fluid passage extends through said closure means at said one end of said outer cylinder.

4. A pressure generating device, comprising:
   (a) a pressure vessel having a longitudinal axis and having a first hollow cylindrical interior cavity coaxial with said vessel;
   (b) closure means acting in opposite ends of said pressure vessel for closing the respective ends of said first cavity;
   (c) a first cylinder coaxial with said vessel and located within said first cavity, said first cylinder having an outside diameter less than the diameter of said first cavity to define a first pressure chamber between the inner surface of said pressure vessel and the outer surface of said first cylinder, said first cylinder having a second hollow cylindrical interior cavity coaxial with said vessel;
   (d) a second cylinder coaxial with said vessel and located within said second cavity, said second cylinder having an outside diameter less than the inside diameter of said first cylinder to define therebetween a second pressure chamber, said second cylinder having a third hollow cylindrical interior cavity coaxial with said vessel and forming a third pressure chamber;
   (e) a first piston having an annular body aligned with and in slidable contact with the walls of said second chamber at the end of said second chamber nearest one end of said vessel, said first piston having an annular head with a diameter greater than the diameter of said body of said first piston, said head of said first piston being spaced from said closure means at said one end of said vessel to define therebetween a first fluid receiving space;
   (f) a second piston having a cylindrical body aligned with and in slidable contact with the walls of said third chamber at the end of said third chamber nearest the other end of said vessel, said second piston having a cylindrical head with a diameter greater than the diameter of said body of said second piston, said head of said second piston being spaced from said closure means at said other end of said vessel to define therebetween a second fluid receiving space;
   (g) first fluid passage means communicating between said first pressure chamber and the exterior of said vessel to admit a compressible fluid under a first pressure to said first pressure chamber, said second and third pressure chambers each also being filled with a compressible fluid;
   (h) second fluid passage means intercoupling said first pressure chamber and said first fluid receiving space to apply said first fluid under said first pressure to said head of said first piston whereby said first piston acts to compress the fluid in said second chamber to a second pressure; and
   (l) third fluid passage means intercoupling said second chamber and said second fluid receiving space to apply the fluid from said second chamber to said head of said second piston at said second pressure whereby said second piston acts to compress the fluid in said third chamber to a third pressure.

5. A pressure generating device as set forth in claim 4 in which there is provided a fourth fluid passage means extending through said closure means at said one end of said vessel and communicating with said third chamber to deliver said fluid from said third chamber at said third pressure.

6. A pressure generating device as set forth in claim 4 in which said vessel is cylindrical in shape and in which said first fluid passage extends radially through the cylindrical wall of said vessel.

7. A pressure generating device as set forth in claim 4 in which each of said first and second cylinders comprises tightly engaged, coaxial, inner and outer cylindrical sleeves having therebetween, at atmospheric pressure, a residual negative compressive stress.

8. A pressure generating device as set forth in claim 7 in which the outer sleeve of each of said cylinders abuts against said closure means at opposite ends thereof, the inner sleeve of said first cylinder abuts against said closure means at said other end of said vessel, the inner sleeve of said second cylinder abuts against said closure means at said one end of said vessel, and in which said inner sleeves are each shorter than the corresponding outer sleeve to afford a first open space between the free end of said inner sleeve of said first cylinder and the closure means at said one end of said vessel and to afford a second open space between the free end of said inner sleeve of said second cylinder and the closure means at said other end of said vessel.

9. A pressure generating device as set forth in claim 8 in which said head of said first piston is located in said first open space and said head of said second piston is located in said second open space.

10. A pressure generating device as set forth in claim 4 in which said vessel is a hollow cylinder open at both ends and is provided with an internal annular shoulder at each end located axially inwardly of the open ends.

11. A pressure generating device as set forth in claim 10 in which said closure means at said other end of said vessel comprises a cylindrical plug having a closure surface spanning said annular shoulder.

12. A pressure generating device as set forth in claim 11 in which said closure means at said other end of said vessel includes a cup shaped element having an annular body located in and filling one end of said second chamber and a circular base abutting said closure surface.

13. A pressure generating device as set forth in claim 12 in which said third fluid passage comprises a drilled hole extending radially through the wall of said second cylinder and into said annular body of said cup shaped element and axially through said body of said cup shaped element.

14. A pressure generating device as set forth in claim 4 in which said vessel is a hollow cylinder open at said one end and having an internal annular shoulder located axially inwardly of said one end, said closure means for said one end of said vessel comprising an annular plug located in said one end of said vessel and spanning said annular shoulder, and fitting means extending through the central opening of said annular plug and closing said central opening, said fitting means having a central passage communicating with said third chamber for delivering fluid from said third chamber to said third passage.

15. A pressure generating device, comprising:
 (a) a cylindrical pressure vessel open at both ends and having a first hollow cylindrical interior cavity coaxial with said vessel, said vessel having an internal annular shoulder at each end thereof located axially inwardly of the corresponding end;
 (b) closure means acting in opposite ends of said pressure vessel for closing the respective ends of said first cavity, said closure means for one end of said vessel comprising an annular plug having a surface spanning the corresponding shoulder thereof and said closure means for the other end of said vessel comprising a cylindrical plug having a surface spanning the corresponding shoulder thereof;
 (c) a first cylinder coaxial with said vessel and located within said first cavity, said first cylinder having an outside diameter less than the outside diameter of said first cavity to define a first pressure chamber between the inner surface of said pressure vessel and the outer surface of said first cylinder, said first cylinder being hollow and having a second hollow cylindrical interior cavity coaxial with said vessel, said first cylinder being formed from tightly contacting inner and outer cylindrical sleeves, the outer one of which abuts said closure means at both ends of said vessel and the inner one of which abuts said closure means at said other end of said vessel and has a free end spaced from said closure means at said one end of said vessel to define therebetween a first open space;
 (d) a second cylinder coaxial with said vessel and located within said second cavity, said second cylinder having an outside diameter less than the inside diameter of said first cylinder to define therebetween a second pressure chamber, said second cylinder being hollow and having a third hollow cylindrical interior cavity coaxial with said vessel and forming a third pressure chamber, said second cylinder being formed from tightly contacting inner and outer cylindrical sleeves, the outer one of which abuts said closure means at both ends of said vessel and the inner one of which abuts said closure means at said one end of said vessel and has a free end spaced from said closure means at said other end of said vessel to define therebetween a second open space;
 (e) a first piston having an annular body aligned with and in slidable pressure-tight contact with the walls of said second chamber at the end of said second chamber nearest said one end of said vessel, said first piston having an annular head with a diameter greater than the diameter of said body of said first piston, said head of said first piston being located in said first open space and being spaced from said closure means at said one end of said vessel to define therebetween a first fluid receiving space;
 (f) a second piston having a cylindrical body aligned with and in slidable pressure-tight contact with the walls of said third chamber at the end of said third chamber nearest said other end of said vessel, said second piston having a cylindrical head with a diameter greater than the diameter of said body of said second piston, said head of said second piston being located in said second open space and being spaced from said closure means at said other end of said vessel to define therebetween a second fluid receiving space;
 (g) a first fluid passage extending radially through the wall of said vessel and communicating between said first pressure chamber and the exterior of said vessel to admit a compressible fluid under a first pressure to said first pressure chamber, said second and third pressure chambers each also being filled with a compressible fluid;
 (h) a second fluid passage intercoupling said first pressure chamber and said first fluid receiving space to apply said first fluid under said first pressure to said head of said first piston whereby said first piston acts to compress the fluid in said second chamber to a second pressure;
 (i) a third fluid passage intercoupling said second chamber and said second fluid receiving space to apply the fluid from said second chamber to said head of said second piston at said second pressure whereby said second piston acts to compress the fluid in said third chamber to a third pressure; and
 (j) a cylindrical fitting extending through the central space in said annular plug and having a fourth fluid passage communicating with said third chamber to deliver the fluid from sid third chamber at said third pressure.

References Cited
UNITED STATES PATENTS

| | | |
|---|---|---|
| 841,972 | 1/1907 | Huber. |
| 2,649,691 | 8/1953 | Johnson. |
| 3,191,383 | 6/1965 | Basset. |
| 3,200,596 | 8/1965 | Olson et al. _____ 60—10.5 XR |
| 3,255,490 | 6/1966 | Sturm. |

MARTIN P. SCHWADRON, Primary Examiner

ROBERT R. BUNEVICH, Assistant Examiner

U.S. Cl. X.R.

60—10.5

PO-1050
(5/69)

UNITED STATES PATENT OFFICE
CERTIFICATE OF CORRECTION

Patent No. 3,482,401            Dated December 9, 1969

Inventor(s) Harold H. Waite

It is certified that error appears in the above-identified patent and that said Letters Patent are hereby corrected as shown below:

Col. 1, line 36, "highr" should be -- higher --; line 37, "pressure" should be -- pressures --; line 38, "isotate" should be -- isostatic --.

Col. 2, line 28, "sildable" should be -- slidable --.

Col. 3, line 11, "end vessel" should be -- end of vessel --; line 29, delete "plug 26 and nut 27 serving as the end closure for the"; line 64, "leagage" should be -- leakage --.

Col. 4, line 5, "cylinder 11" should be -- cylinder 12 --; line 20, "plug 27" should be -- plug 26 --; line 30, "opening sleeve" should be -- opening in sleeve --; line 31, "annlular" should be -- annular --; line 36, "sylindrical" should be -- cylindrical --.

Col. 5, line 12, "anular" should be -- annular --; line 32, "chamber 38" should be -- chamber 37 --.

Col. 6, line 42, "dimension" should be -- dimensions --.

Col. 7, line 31, "cylinder" should be -- piston --.

Col. 9, line 36, "to" should be -- at --.

Col. 10, line 55, "sid" should be -- said --.

SIGNED AND
SEALED
JUN 16 1970

(SEAL)
Attest:

Edward M. Fletcher, Jr.
Attesting Officer

WILLIAM E. SCHUYLER, JR
Commissioner of Patents